3,278,261
PREPARATION OF DENSE CHROMIC OXIDE
Robert A. Kearley, Corpus Christi, Tex., assignor to Pittsburgh Plate Glass Company, Pittsburgh, Pa., a corporation of Pennsylvania
No Drawing. Filed Dec. 7, 1965, Ser. No. 512,189
6 Claims. (Cl. 23—145)

This application is a continuation-in-part of copending U.S. application Serial Number 391,000 filed August 20, 1964, now abandoned, the latter application being a continuation of U.S. application Serial Number 147,079, filed October 23, 1961, now abandoned.

This invention relates to the production of chromic oxide from ammonium chromates, including ammonium chromate, and ammonium dichromate and other polychromates at an elevated temperature. In many cases, the product produced in this manner is low in bulk density, ranging between about 0.1 and 0.2 gram per cubic centimeter.

According to the present invention, it has been found that chromic oxide which is substantially higher in bulk density, usually ranging from about 0.75 to 2 grams per cubic centimeter, and which is in a physical from suitable for metallurgical and/or pigment use, may be prepared by heating chromic oxide which has been prepared by decomposition of ammonium chromate or ammonium dichromate in admixture with a small amount (usually in the range of 0.1 to 5 or 10 percent by weight based upon the weight of the chromic oxide) of a fusible water soluble, inert solid, which is stable but fuses at a temperature above 200° C. and substantially below the temperature at which chromic oxide fuses, usually in the range of 200° C. to 1200° C., the temperature of heating being at a temperature at which the solid fuses but below the temperature at which the chromic oxide fuses. Usually, the chromic oxide is heated at a temperature in the range of about 200° C. to 1200° C.

According to a preferred embodiment of the invention, chromic oxide may be prepared directly in a relatively dense form by heating ammonium chromate or ammonium dichromate which is mixed with an alkali metal halide solid to a temperature at which the chromate or dichromate, as the case may be, decomposes. This decomposition takes place at any temperature above about 200° C. to 225° C. The temperature of heating generally is above the fusion temperature of the alkali metal halide or mixture of alkali metal halides incorporated with the ammonium chromate or dichromate and is not in excess of 1500° C., usually below 1200° C.

For most purposes, the solid fusible alkali metal halide should be water soluble, that is, a water solubility of at least one gram per liter, preferably at least two or three grams per liter. By using such water soluble materials, it is possible to extract the fused solid or major portion thereof from the chromic oxide after the densification has been effected. This enables production of a product of very high purity.

Typical alkali metal halides which have been found to be suitable are sodium chloride, potassium chloride, lithium chloride, and the corresponding fluorides, bromides and iodides. Other materials which can be used are the alkaline earth metal halides, such as calcium chloride, magnesium chloride, barium chloride, strontium chloride, and corresponding iodides, fluorides, and bromides having adequate water solubility. Similarly, various alkali metal or alkaline earth metal sulfates and nitrates can also be used. Also sodium hydroxide, potassium hydroxide, potassium nitrate, cupric chloride, cupric bromide, and like solids which have a water solubility of at least one gram per liter, preferably at least 2 or 3 grams per liter, may be used.

The amount of fusible solid used should be sufficient to cause the densification. Usually, an amount in excess of about 0.1 percent based upon the weight of the chromic oxide is used. Concentrations in the range of 0.1 to 5 percent based upon the weight of the chromic oxide (or on the chromic oxide equivalent of the chromate or dichromate) normally are used. Larger concentrations above this level usually are not necessary but are not objectionable.

When the chromic oxide is prepared from ammonium dichromate or chromate, and the alkali metal halide is incorporated in the ammonium chromate or dichromate prior to decomposition, the same amount of alkali metal halide is used base upon the amount of chromic oxide which is stoichiometrically equivalent to the amount of chromate or dichromate used.

The process may be conducted in various ways. For example, preformed chromic oxide may be sprayed or tumbled with an aqueous solution of the fusible solid and after mixing is substantially complete and a relatively uniform product is produced, the mixture is dried and calcined at an elevated temperature above the fusion temperature of the fusible solid. In this case, the temperature of calcination will depend upon the solid used. For example, when sodium chloride is used, a temperature of at least 800° C. is preferred. On the other hand, where a material such as sodium hydroxide is used, temperatures as low as 350° C. or 500° C. are satisfactory. In like manner, where eutectic mixtures of alkali metal chlorides, such as a mixture of potassium chloride and lithium chloride, are used, temperatures at or a few degrees above the temperature at which the eutectic melts may be resorted to.

As previously stated, the process is preferably conducted in conjunction with the process of producing the chromic oxide. In such a case, ammonium chromate or dichromate mixed with the fusible solid is heated to decomposition temperature, care being exercised to make certain that the temperature of decomposition is at or above the fusion point of the solid.

A convenient method of preparing ammonium chromate or ammonium dichromate is to react sodium chromate or sodium dichromate or chromate or dichromate of other alkali metal with ammonium chloride or other ammonium salt. In such a case, a double decomposition reaction tends to take place causing formation of the corresponding ammonium chromate or dichromate. This salt may then be decomposed by subjecting the solution to a temperature at which decomposition takes place. For best results, the ammonium chromate or dichromate is crystallized out of solution and the resulting salt is then heated to a decomposition temperature at which the fusible material is in a liquid or molten state.

In either of these cases, care is taken to ensure the presence of a fusible material of the type specified above during the calcination. For example, alkali metal halide, e.g., chloride, is intrinsically generated in the course of the addition of ammonium chloride or like halide to an aqueous solution of sodium dichromate or sodium chromate or like alkali metal chromate or dichromate. If care is taken to avoid removal of all of the sodium chloride or like alkali metal halide from the resulting ammonium chromate or dichromate, the decomposition can take place in the presence of the chloride or other halide thus generated in situ. This course insures uniform distribution of the fusible solids throughout the chromate or dichromate. Thus, the ammonium chromate or dichromate may be crystallized from the solution as a crystalline solid, care being taken to avoid washing all of the alkali metal halide from the resulting crystals and to insure the presence of the required concentration of such fusible solid. This solid may be decomposed by heating to a temperature above the fusion point of the fusible solid. This heating may be achieved by feeding the ammonium chromate or dichromate which contains the fusible solid directly into a preheated zone which it as a temperature at or above that at which the soluble solid (sodium chloride or the like) fuses. This can be accomplished effectively and the temperature of the zone maintained by feeding the chromate or dichromate fast enough to liberate the amount of heat required to maintain the desired temperature.

According to another method, a bed or layer of the ammonium chromate or dichromate may be established and one portion thereof be ignited, for example, by direct contact with a flame. The reaction, once started, then spreads rapidly over the remainder of the bed or layer.

Following the densification operation, whether accomplished in conjunction with the chromic oxide production or subsequent thereto, the fusible agent normally is washed out in order to produce a chromic oxide of high purity. This is accomplished, of course, by dispersing the chromic oxide in water and dissolving the water soluble salt and then filtering or otherwise recovering the chromic oxide.

According to a further embodiment of the invention and in order to obtain a rapidly settling or rapidly filtering chromic oxide, it is necessary to adjust or maintain the pH of the chromic oxide slurry from which the chromic oxide is ultimately to be obtained after washing to a pH below about 6.4. If the pH is above 6.4, the chromic oxide thus obtained is found to be very difficult to separate from aqueous medium.

The following examples are typical:

EXAMPLE I

Twenty-five (25) grams of ammonium dichromate crystals containing 0.005 percent by weight of sodium chloride was mixed with 0.37 gram of sodium chloride dissolved in 2 milliliters of water and the mixture stirred with a further addition of about 18 milliliters of water until a uniformly damp solid was obtained. This material was dried at 110° C. and then heated by placing it in a central portion of a glass tube 3 inches in diameter and 3 feet long and heating the tube in a flame until decomposition began. As soon as decomposition was initiated, the flame was removed and decomposition of the ammonium dichromate continued until the reaction was substantially complete. Thereafter, the resulting product was calcined by heating at a temperature of 800° C. for 30 minutes. This product was found to have a bulk density of 2.61 grams per milliliter.

EXAMPLE II

Twenty-five (25) grams of ammonium dichromate was decomposed by heating as in Example I to produce chromic oxide. This product was then mixed with 0.37 gram of sodium chloride dissolved in 2 milliliters of water and stirred with further addition of 18 milliliters of water until a uniformly damp solid was obtained. The resulting product was then washed and dried at 110° C. and calcined by heating at 850° C. for 30 minutes. This product was found to have a bulk density of 2.35 grams per milliliter. In contrast, the product obtained directly from the ammonium dichromate decomposition has a bulk density less than 0.2 gram per milliliter.

EXAMPLE III

Twenty-five (25) grams of ammonium dichromate was decomposed as in Example I and the resulting chromic oxide was mixed with 1.5 percent by weight of NaOH in the form of an aqueous solution, about 18 milliliters of water being used to dissolve the NaOH and to mix the sodium hydroxide solution with the chromic oxide. This product was dried as in Example II and calcined at 850° C. of 30 minutes, the bulk density of the product obtained being 1.62 grams per milliliter.

In the above tests, the calcination was effected at a temperature of 850° C. It should be understood, however, that the temperature of calcination can be conducted at any temperature above the fusion point of the solid which was added. When the solid is a eutectic mixture of sodium chloride and potassium chloride, the temperature of calcination can be as low as 350° C. to 400° C.

EXAMPLE IV

Six (6) pounds of ammonium dichromate crystals containing about 1 percent NaCl and 5 percent moisture by weight was dried at 110° C. and placed in a metal drum 21 inches in diameter, 33 inches high, open at the top, with the dichromate spread evenly over the bottom to give a layer about one inch deep. Decomposition was initiated by heating a small portion of the bottom of the drum with a blow torch. When the reaction initiated, as indicated by rapid evolution of fumes, the heating was discontinued. Within 1 or 2 minutes, the entire amount of ammonium dichromate had decomposed.

The resulting chromic oxide was heated for 15 minutes in a furnace chamber at 850° C. Then it was slurried in water for 30 minutes, the slurry filtered, the filter cake repulped in water and the slurry thus obtained was filtered. After drying at 110° C., this product had a bulk density of 1.6 grams per milliliter.

EXAMPLE V

The reactor used is a cylindrical reactor having a conical bottom provided with electrical heating elements on the conical surface. The bottom of the reactor (about 850 square inches) is heated to a temperature of about 800° C. Ammonium dichromate crystals containing 0.5 to 11.4 percent by weight of NaCl are showered on the hot surface and subsequently on the hot reaction product) at a rate sufficient to liberate enough heat to maintain the chromic oxide produced at a temperature above 800° C. Conveniently, addition of oxide at the rate of 120 to 200 pounds per hour is adequate. The chromic oxide thus formed is withdrawn periodically or continuously after a hot bed of chromic oxide has been built up.

The chromic oxide prepared as in Example V is then subjected to washing in order to remove the water soluble impurities. This is effected by dispersing the chromic oxide in an amount of water sufficient to produce a slurry having about 9 percent by weight of suspended solids and decanting solids from the slurry in filtering the slurry. This may be repeated for the required number of times to reduce the chloride content down to minor amounts, preferably below 0.01 percent by weight.

Rapid settling and filtration of the slurry in such washing is achieved when the pH of the slurry is maintained below about pH 6.5. In some cases, addition of acid is necessary in order to establish such a pH. Typical mineral acids can be used for this purpose.

It will be understood that while the process as described above has been primarily directed to the production of chromic oxide from ammonium dichromate, ammonium chromate may be substituted in lieu of ammonium dichromate in the above examples.

Although the present invention has been described with reference to the specific details of certain embodiments, it is not intended that such details should be regarded as limitations upon the scope of the invention, except insofar as included in the accompanying claims.

I claim:

1. The process of preparing a dense chromic oxide having a bulk density ranging from 0.75 to 2 grams per cubic centimeter which comprises mixing a chromate of the group consisting of ammonium chromate and ammonium dichromate with from 0.1 to 5.0 percent by weight of an alkali metal halide, based upon the weight of the chromic oxide equivalent of said chromate, until a uniform mixture is produced, heating said mixture to a temperature in the range of from 200° C. to 1200° C. until said chromate decomposes to form solid chromic oxide and said alkali metal halide fuses, adding said mixture of fused alkali metal halide and solid chromic oxide to water to form an aqueous slurry, maintaining the pH of said slurry at below about 6.5 to dissolve said fused alkali metal halide in said last named mixture, filtering said aqueous slurry and recovering a dense chromic oxide having a bulk density ranging from 0.75 to 2 grams per cubic centimeter.

2. The process of claim 1 wherein said alkali metal halide is an alkali metal chloride.

3. The process of claim 1 wherein said alkali metal halide is sodium chloride.

4. A process of preparing a dense chromic oxide which comprises heating chromic oxide produced by decomposing a member of the group consisting of ammonium chromate and ammonium dichromate in the presence of a densifying amount of water soluble, fusible, stable, inert alkali metal halide solid to a temperature at which the halide fuses, but below the fusion point of chromic oxide, adding the fused halide and solid chromic oxide to water to form an aqueous slurry, maintaining the pH of the slurry below about 6.5, filtering the slurry, and recovering dense chromic oxide.

5. A process of preparing a dense chromic oxide which comprises mixing a chromate member of the group consisting of ammonium chromate and ammonium dichromate with a densifying amount of a water soluble, fusible, inert solid selected from the group consisting of alkali metal halide, alkaline earth metal halide, and sodium hydroxide, until a uniform mixture is obtained, heating said mixture to a temperature sufficient to decompose the chromate to chromic oxide and fuse the inert solid but below the fusion point of the chromic oxide, adding the resulting mixture of fused solid and chromic oxide to water to form an aqueous slurry, maintaining the pH of the slurry below about 6.5 to dissolve the fused solid, filtering the slurry, and recovering a dense chromic oxide.

6. A process of preparing a dense chromic oxide by the decomposition of a member of the group consisting of ammonium chromate and ammonium dichromate which comprises decomposing said member at 200° C. to 1200° C. in the presence of a densifying amount of a water soluble, fusible, inert alkali metal halide so as to produce a mixture of solid chromic oxide and fused alkali metal halide, forming an aqueous slurry by adding the mixture to water, maintaining the pH of the slurry below about 6.5, filtering the slurry, and recovering a dense chromic oxide.

References Cited by the Examiner
UNITED STATES PATENTS
2,250,789  7/1941  Ayers _____ 23—145

OTHER REFERENCES

Mellor, Comprehensive Treatise on Inorganic and Theoretical Chemistry, vol. 11 (1931), pgs. 176–177, pub. by Longmans, Green and Co., New York, N. Y.

OSCAR R. VERTIZ, *Primary Examiner.*

B. H. LEVENSON, *Assistant Examiner.*